(12) United States Patent
Choi et al.

(10) Patent No.: US 7,292,554 B2
(45) Date of Patent: Nov. 6, 2007

(54) APPARATUS AND METHOD FOR TRANSMITTING A VOICE FRAME IN AN ALL-IP-BASED MOBILE COMMUNICATION SYSTEM

(75) Inventors: Jae-Am Choi, Yongin-shi (KR); Jong-Oh Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1025 days.

(21) Appl. No.: 10/190,184

(22) Filed: Jul. 5, 2002

(65) Prior Publication Data

US 2003/0012172 A1 Jan. 16, 2003

(30) Foreign Application Priority Data

Jul. 5, 2001 (KR) ............................... 2001-39913

(51) Int. Cl.
*H04B 7/216* (2006.01)
*H04Q 7/20* (2006.01)
*H04L 29/06* (2006.01)

(52) U.S. Cl. ...................... 370/335; 370/338; 370/342; 370/349; 370/352; 370/410; 455/445; 455/450

(58) Field of Classification Search ................ 370/335, 370/338, 342, 349, 352, 410; 455/445, 450
See application file for complete search history.

(56) References Cited

U.S. PATENT DOCUMENTS

| | | | | |
|---|---|---|---|---|
| 5,305,308 A | * | 4/1994 | English et al. | ............... 370/335 |
| 5,878,036 A | * | 3/1999 | Spartz et al. | ............... 370/335 |
| 5,953,322 A | | 9/1999 | Kimball | |
| 6,032,197 A | * | 2/2000 | Birdwell et al. | ............ 709/247 |
| 6,172,986 B1 | | 1/2001 | Watanuki et al. | |
| 6,178,337 B1 | * | 1/2001 | Spartz et al. | ............... 455/561 |
| 6,314,095 B1 | * | 11/2001 | Loa | ............................. 370/352 |
| 6,449,269 B1 | * | 9/2002 | Edholm | ..................... 370/352 |
| 6,567,428 B1 | * | 5/2003 | Rubin et al. | ................ 370/538 |
| 6,584,122 B1 | * | 6/2003 | Matthews et al. | .......... 370/493 |
| 6,678,280 B1 | * | 1/2004 | Kim et al. | ................... 370/429 |
| 6,711,417 B1 | * | 3/2004 | Gorman et al. | .......... 455/550.1 |
| 6,721,333 B1 | * | 4/2004 | Milton et al. | ............... 370/469 |

(Continued)

FOREIGN PATENT DOCUMENTS

EP 1 032 178 A1 8/2000

(Continued)

OTHER PUBLICATIONS

Peter J McCann et al., Lucent Technologies, Requirements and Architecture for Header Stripping and Generation, Jun. 2001.

(Continued)

*Primary Examiner*—Alpus H. Hsu
(74) *Attorney, Agent, or Firm*—The Farrell Law Firm

(57) ABSTRACT

A method for transmitting voice traffic in an ALL-IP-based mobile communication system. A mobile terminal first transmits header information using a signaling frame, and then separately transmits only a voice frame. A Node B detects the header information from the signaling frame received, stores the detected header information, and upon receipt of the voice frame, adds the header information to the voice frame and transmits the header-added voice frame to a core network.

28 Claims, 7 Drawing Sheets

U.S. PATENT DOCUMENTS

| | | | |
|---|---|---|---|
| 6,724,740 B1 * | 4/2004 | Choi et al. | 370/335 |
| 7,006,459 B2 * | 2/2006 | Kokot et al. | 370/310.2 |
| 7,058,042 B2 * | 6/2006 | Bontempi et al. | 370/338 |
| 7,058,076 B1 * | 6/2006 | Jiang | 370/465 |
| 7,200,139 B1 * | 4/2007 | Chu et al. | 370/352 |

FOREIGN PATENT DOCUMENTS

| | | |
|---|---|---|
| EP | 1056259 | 11/2000 |
| EP | 1 206 071 A2 | 5/2002 |
| JP | 2000-224231 | 8/2000 |
| RU | 19970121000 | 5/1996 |
| WO | WO 00/72549 | 11/2000 |
| WO | WO 02/28056 | 4/2002 |
| WO | WO 02/35863 | 5/2002 |

OTHER PUBLICATIONS

3GPP Technical Specification Group GSM/EDGE: Radio Access Network; Overall Description; Stage 2 (Release 5), Jun. 2001.
International Search Report dated Nov. 12, 2002 issued in a counterpart application, namely, Appln. No. PCT/KR02/01278.

* cited by examiner

APPARATUS AND METHOD FOR TRANSMITTING A VOICE FRAME IN AN ALL-IP-BASED MOBILE COMMUNICATION SYSTEM

PRIORITY

This application claims priority to an application entitled "Apparatus and Method for Transmitting Voice Frame in a Mobile Communication System Including ALL-IP Network" filed in the Korean Industrial Property Office on Jul. 5, 2001 and assigned Serial No. 2001-39913, the contents of which are hereby incorporated by reference.

BACKGROUND OF THE INVENTION

1. Field of the Invention

The present invention relates generally to an apparatus and method for transmitting voice/data frames in a mobile communication system supporting an ALL-IP network that transmits both packet data and circuit data using an Internet protocol (IP), and in particular, to an apparatus and method for removing a header from an ALL-IP-based voice/data transmission frame.

2. Description of the Related Art

An IMT-2000 (International Mobile Telecommunication-2000) network supports both a packet network and a circuit network. Recently, in order to more effectively perform packet transmission in the IMT-2000 network supporting both the packet network and the circuit network, attempts have been made to integrate the networks into an IP network, called an ALL-IP network. The integration of the existing networks into the ALL-IP network has been conducted by a future mobile communication standardization organization including the 3GPP ($3^{rd}$ Generation Partnership Project), the UMTS (Universal Mobile Telecommunications System) standardization organization. The ALL-IP network has an open-type data network structure, so it can effectively introduce various services that will become available in the future, especially IP-based services. In addition, the ALL-IP network, as can be inferred from the term, has a function of transmitting circuit data, i.e., voice through packetization. Therefore, for voice transmission, the ALL-IP network converts a voice into voice data and transmits the converted voice data in a frame unit (hereinafter, referred to as "voice frame"). The voice frame includes an IP header so that the voice data can be properly transmitted to the IP network.

FIG. 1 illustrates a structure of a UMTS system having an IP network. Referring to FIG. 1, UMTS system consists of a Node B (111-2), a radio network controller (RNC) 120 controlling the Node B, a co-network (CN) 140, a serving GPRS (general packet radio service) support node (SGSN) 130, a gateway GPRS support node (GGSN) 150, and a mobile terminal (MT) 101 is connected to an IP network 160 through a Node B 111-2, an RNC (Radio Network Controller) 120, an SGSN (Serving GPRS (General Packet Radio Service) Support Node) 130, and a GGSN (Gateway GPRS Support Node) 150. Here, the mobile terminal 101 may include a mobile phone or a personal computer (PC) connected to the mobile phone. During voice and data transmission, the mobile terminal 101 packetizes voice and data according to the Internet protocol (IP), and then transmits the packetized voice and data to the IP network 160 through the above elements.

The mobile terminal 101 converts voice input by a user into voice data, and constructs a voice frame using the converted voice data. The mobile terminal 101 generates a transmission frame by adding headers to the voice frame, and transmits the generated transmission frame to the Node B 111. The structure and operation of the mobile terminal 101 and the Node B 111 will be described in detail with reference to FIG. 2.

Referring to FIG. 2, a voice frame generator 203 converts voice input by the user into voice data, and constructs voice frames using the converted voice data. A signaling generator 201 receives information on an IP address or telephone number input by the user, and provides a protocol stack 205 with a header generation signal based on the received information. The protocol stack 205 generates header information according to a real time protocol (RTP), a user datagram protocol (UDP), and Internet protocol (IP), in response to the header generation signal. The headers generated by the protocol stack 205 are added to the head of the voice frame generated by the voice frame generator 203, and then transmitted to the Node B 111 through a channel allocated by a physical layer 207. Reference numeral 221 represents the voice frame generated by the voice frame generator 203, and reference numeral 223 represents the voice frame to which an RTP header 'b' is added in an RTP layer. Further, reference numeral 225 represents the RTP header-added voice frame output from the RTP layer, to which a UDP header 'c' is added in a UDP layer, and reference numeral 227 represents the RTP/UDP header-added voice frame output from the UDP layer, to which an IP header 'd' is added in an IP layer. As represented by reference numeral 227, the transmission frame is constructed by adding the RTP header 'b', the UDP header 'c' and the IP header 'd' to the voice frame, and the transmission frame is transmitted to the Node B 111 through the physical layer 207.

The Node B 111 receives the transmission frame transmitted by the mobile terminal 101 through a physical layer 211. A frame processor 213 detects (extracts) headers from the transmission frame received through the physical layer 211, and processes the voice frame according to the detected header information.

For example, an existing UMTS AMR (Adaptive Multi Rate) codec inserts a 40-byte header in a 30-byte voice frame in order to transmit a transmission frame in the ALL-IP network. FIG. 3 illustrates a structure of the transmission frame. For example, if a voice frame handled by the AMR codec is 15-32 bytes, then a header of a total of 40 bytes including a 12-byte RTP header, an 8-byte UDP header and a 20-byte IP header is added to the head of the voice frame. Further, an additional header may be optionally added to the voice frame. As a result, the actual size of the voice frame among the transmission frames transmitted over a radio link becomes less than 50% of the whole traffic.

As described above, in the mobile communication system employing the ALL-IP network, during data transmission, the size of the header is larger than the number of bytes of the actual transmission voice data, bringing about a waste of radio resources.

SUMMARY OF THE INVENTION

It is, therefore, an object of the present invention to provide an apparatus and method for preventing excessive addition of headers to the traffics on a radio link between a mobile terminal and a Node B in a mobile communication system employing an IP network.

It is another object of the present invention to provide an apparatus and method for adding header information to a voice/data frame received from a mobile terminal before transmission to a core network, and removing header information from a transmission frame received from the core network before transmission to a mobile terminal by a Node B in a mobile communication system employing an IP network.

It is further another object of the present invention to provide an apparatus and method for separating header information and a voice frame before transmission by a mobile terminal in a mobile communication system employing an IP network.

It is further another object of the present invention to provide an apparatus and method for storing header information received, and upon receipt of a voice frame corresponding to the header information, adding the header information to the received voice frame and transmitting it to a core network by a Node B in a mobile communication system employing an IP network including a mobile terminal for separating the header information and the voice frame, and transmitting them through different channels.

It is yet another object of the present invention to provide an apparatus and method for use in a mobile communication system employing an IP network, wherein a mobile terminal separates header information and a voice frame and transmits them through different channels, wherein a Node B stores the header information received through a corresponding channel, receives the voice frame through the other channel, and adds the header to the voice frame before transmission to a core network.

It is still another object of the present invention to provide an apparatus and method for removing header information from a transmission frame received from a core network and transmitting only a voice frame from a Node B to a mobile terminal.

In accordance with a first aspect of the present invention, there is provided a transmission apparatus for transmitting a signaling frame and a voice frame to a reception apparatus in a CDMA mobile communication system having an ALL-IP network. The transmission apparatus comprises a signaling frame transmitter for transmitting header information, needed to transmit a voice frame to a destination, to the reception apparatus through a signaling frame during a call setup at a call attempt request of a user; and a voice frame transmitter for constructing the voice frame using only voice data to be transmitted, upon completion of the call setup, and transmitting the voice frame to the reception apparatus.

In accordance with a second aspect of the present invention, there is provided a method for transmitting a signaling frame and a voice frame to a reception apparatus in a CDMA mobile communication system having an ALL-IP network. The method comprises transmitting header information, needed to transmit a voice frame to a destination, to the reception apparatus through a signaling frame during a call setup at a call attempt request of a user; and constructing a voice frame using only voice data to be transmitted, upon completion of the call setup, and transmitting the voice frame to the reception apparatus.

In accordance with a third aspect of the present invention, there is provided a method for receiving a signaling frame and a voice frame from at least one transmission apparatus through first and second physical channels in a CDMA mobile communication system having an ALL-IP network. The method comprises the steps of: upon receipt of a call setup request, acquiring header information, needed to transmit a voice frame to a destination, from a signaling frame received through the first physical channel, and storing the acquired header information in association with a code used for the transmission apparatus; after completion of the call setup, extracting a code used for the voice frame received through the second physical channel, and detecting header information corresponding to the extracted code from the header information stored in association with the code; and adding the detected header information to the voice frame, and transmitting the header-added voice frame to the destination.

In accordance with a fourth aspect of the present invention, there is provided an apparatus for receiving a signaling frame and a voice frame from at least one transmission apparatus through first and second physical channels in a CDMA mobile communication system having an ALL-IP network. The apparatus comprises a protocol stack for, upon receipt of a call setup request, acquiring header information, needed to transmit a voice frame to a destination, from a signaling frame received through the first physical channel; a header information storage for storing the acquired header information in association with a code used for the transmission apparatus; and a frame controller for, after completion of the call setup, detecting header information corresponding to a code used for the voice frame received through the second physical channel, adding the detected header information to the voice frame, and transmitting the header-added voice frame to the destination.

In accordance with a fifth aspect of the present invention, there is provided a method for transmitting a frame in a CDMA mobile communication system having an ALL-IP network. The method comprises transmitting header information needed to transmit a voice frame to a destination through a signaling frame, constructing a voice frame using only voice data and transmitting the constructed voice frame; and acquiring header information from the signaling frame, storing the acquired header information, and upon receipt of the voice frame, adding the stored header information to the voice frame, and transmitting the header-added voice frame to a core network.

In accordance with a sixth aspect of the present invention, there is provided an apparatus for transmitting a frame in a CDMA mobile communication system having an ALL-IP network. The apparatus comprises a mobile terminal for transmitting header information needed to transmit a voice frame to a destination through a signaling frame, constructing a voice frame using only voice data and transmitting the constructed voice frame; and a Node B for acquiring header information from the signaling frame, storing the acquired header information, and upon receipt of the voice frame, adding the stored header information to the voice frame, and transmitting the header-added voice frame to a core network.

In accordance with a seventh aspect of the present invention, there is provided a method for transmitting a transmission frame, received from a core network, from a Node B to a mobile terminal in a CDMA mobile communication system having an ALL-IP network and transmitting a signaling frame and a voice frame to the mobile terminal through first and second physical channels. The method comprises determining a type of a transmission frame received from the core network; if the transmission frame is a signaling frame, transmitting the transmission frame with header information to the mobile terminal through the first physical channel; and if the transmission frame is a voice frame, removing header information from the transmission frame, and transmitting the header-removed transmission frame to the mobile terminal through the second physical channel.

In accordance with an eighth aspect of the present invention, there is provided an apparatus for transmitting a transmission frame, received from a core network, from a Node B to a mobile terminal in a CDMA mobile communication system having an ALL-IP network and transmitting a signaling frame and a voice frame to the mobile terminal through first and second physical channels. The apparatus comprises a header information storage for storing header information in association with a code for identifying the mobile terminal; a protocol stack for separating header information from a transmission frame received from the core network; and a frame controller for transmitting the transmission frame with header information to the mobile terminal through the first physical channel if the transmission frame is a signaling frame; and removing header information from the transmission frame, and transmitting the header-removed transmission frame to the mobile terminal through the second physical channel, if the transmission frame is a voice frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
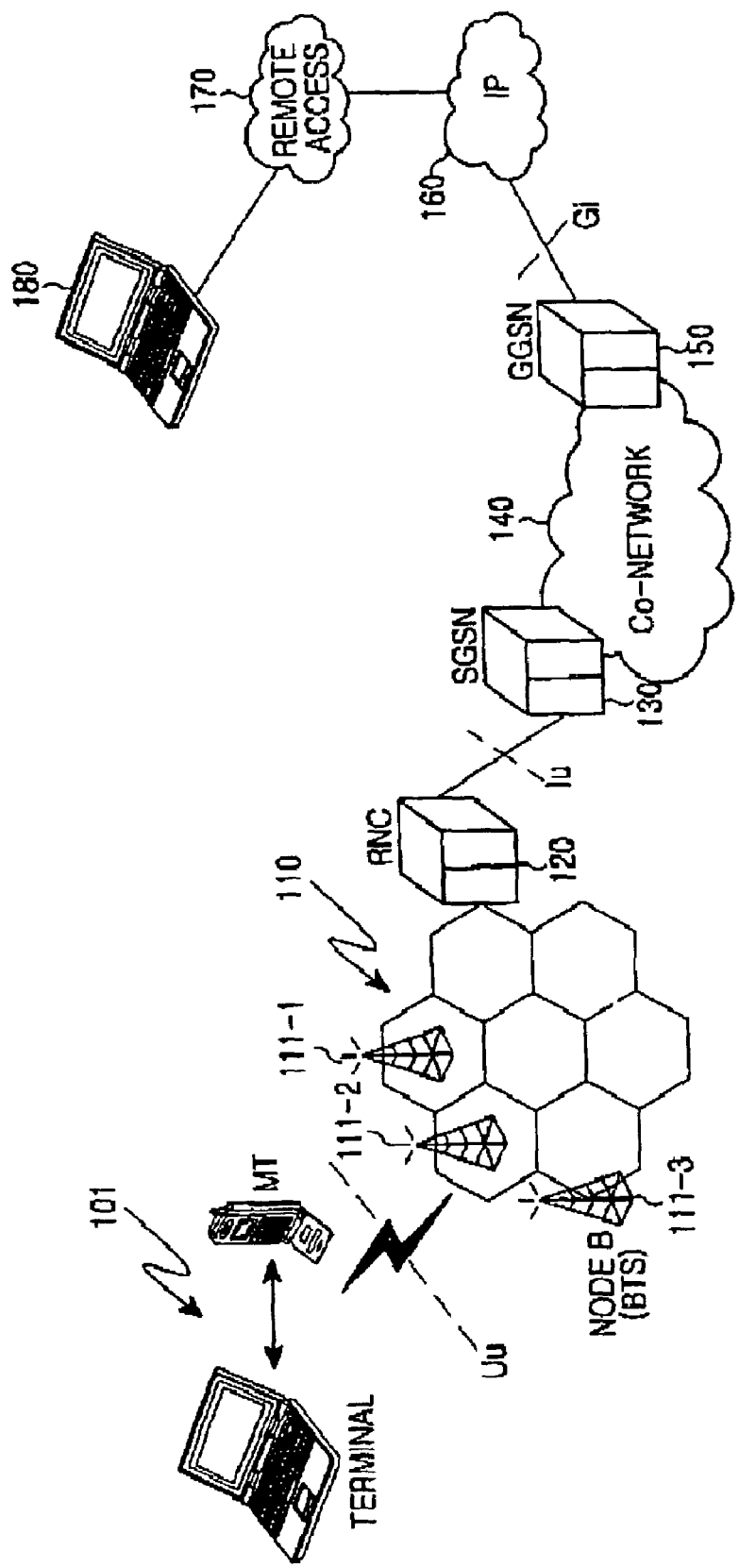
FIG. 1 illustrates a structure of a general mobile communication system supporting an ALL-IP network.
Figure 2:
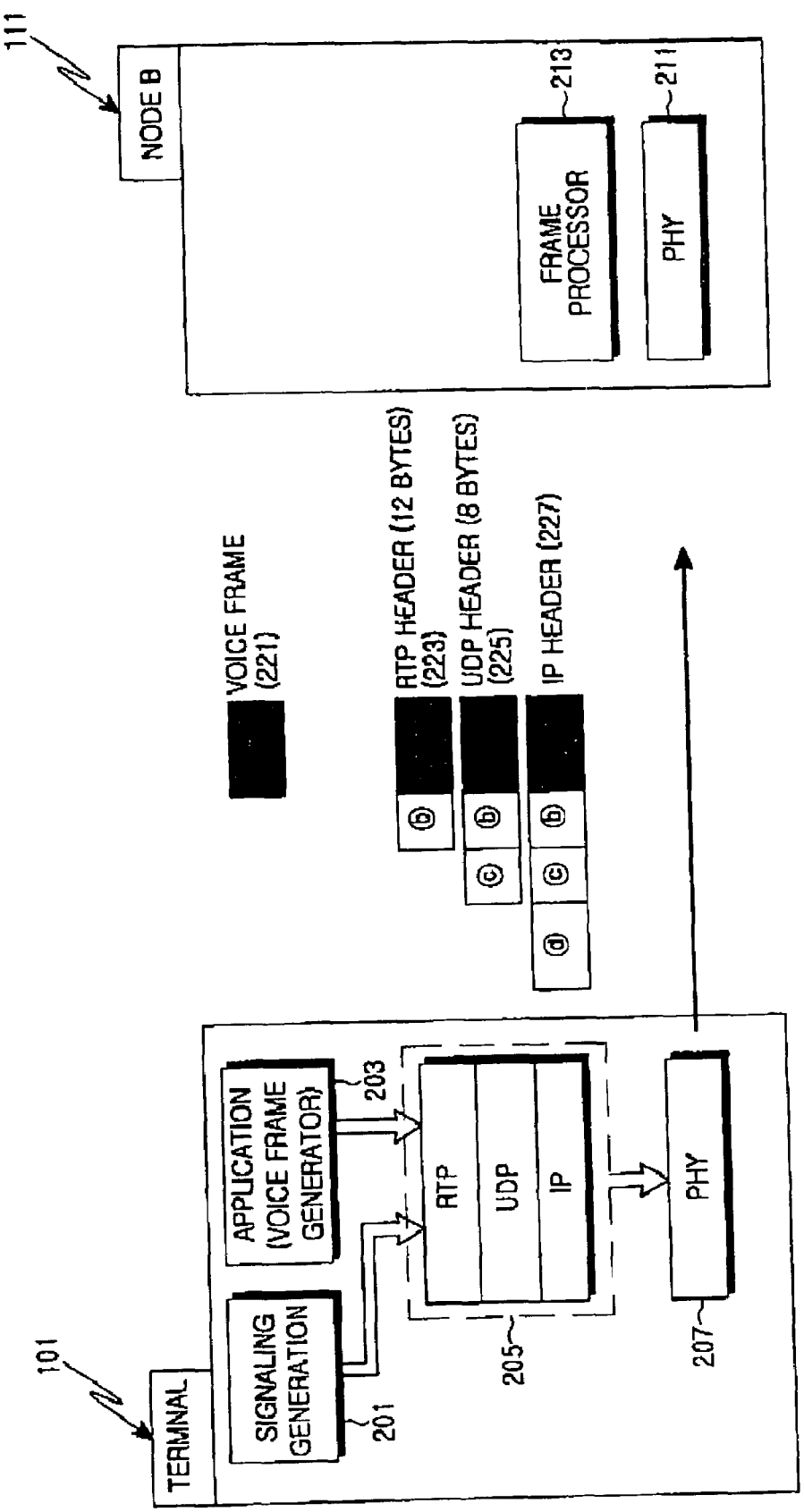
FIG. 2 illustrates a schematic structure of a mobile terminal and a Node B for transmitting a transmission frame including a voice frame in a general mobile communication system supporting an ALL-IP network.
Figure 3:
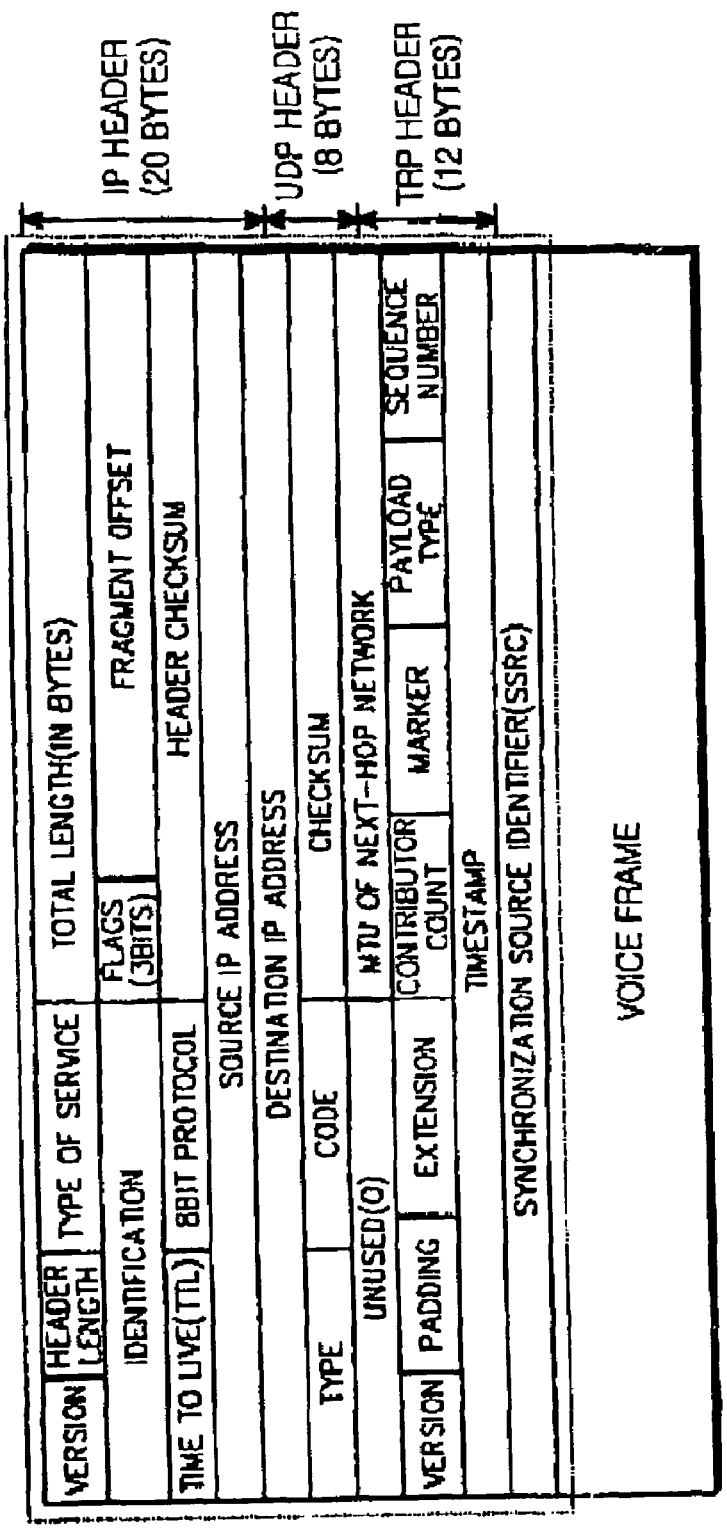
FIG. 3 illustrates a structure of a transmission frame transmitted/received between a mobile terminal and a Node B in a general mobile communication system supporting an ALL-IP network.
Figure 4:
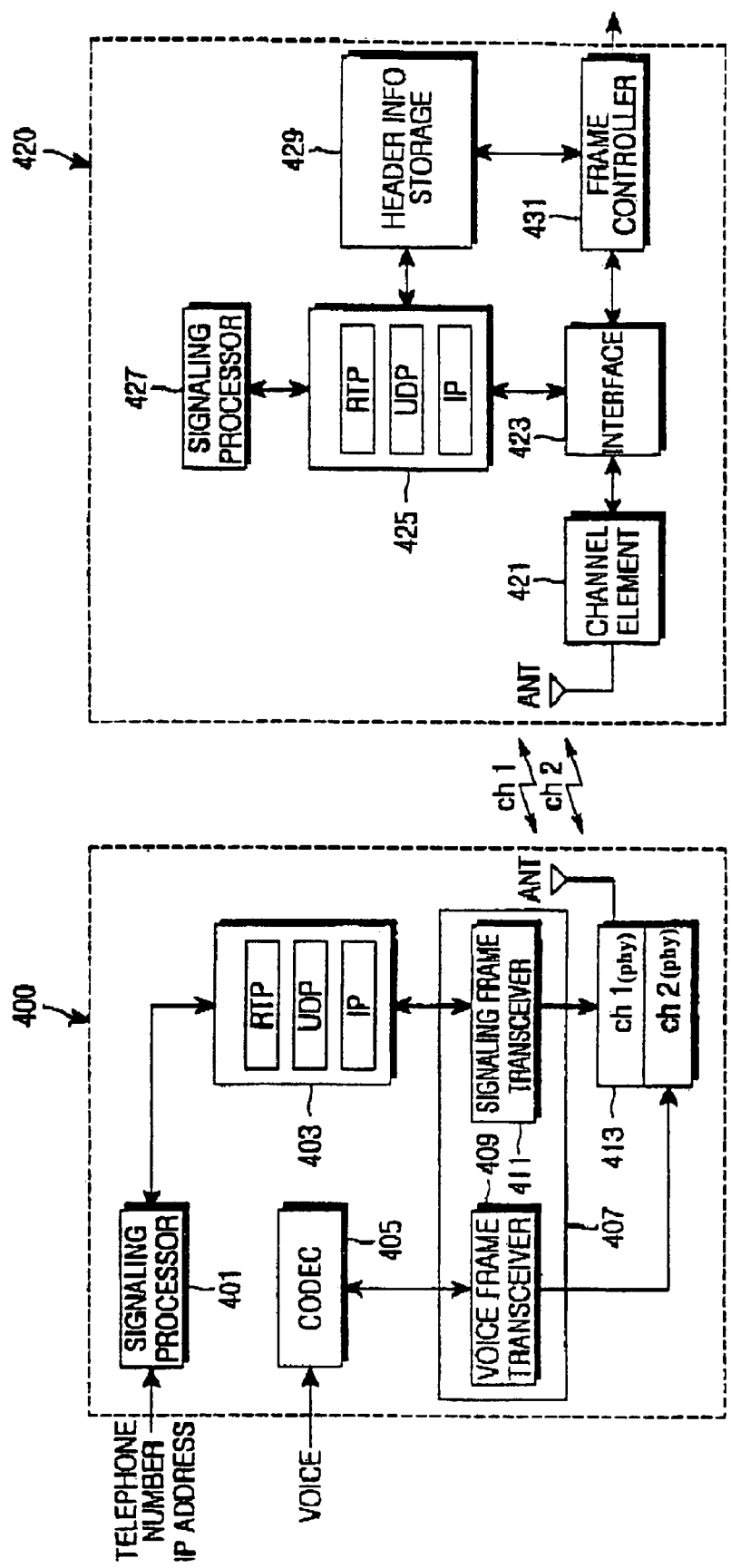
FIG. 4 illustrates a structure of a mobile terminal and a Node B for transmitting a voice frame in a mobile communication system supporting an ALL-IP network according to an embodiment of the present invention.

FIG. 4 illustrates a structure of a mobile terminal and a Node B according to an embodiment of the present invention. A method of transmitting a voice frame will be described with reference to FIG. 4.

In FIG. 4, reference numeral 400 indicates a mobile terminal and reference numeral 420 indicates a Node B. The mobile terminal 400 includes a signaling processor 401 for receiving a telephone number or an IP address input by a user and outputting a header generation command for generating corresponding header information, a protocol stack 403 for generating header information in response to the header generating command, a codec 405 for converting voice input by the user into voice data and outputting a voice frame with a specific length, and a physical layer 413 for transmitting the voice frame through a first channel Ch1 and the header information through a second channel Ch2. Preferably, the first channel Ch1 is a traffic channel and the second channel Ch2 is a control channel.

Further, the Node B 420 includes a channel element 421 for handling signals transmitted and received to/from a plurality of mobile terminals, such as mobile terminal 400, an interface 423 for interfacing signals transmitted/received through the channel element 421 with internal elements, a frame controller 431 for controlling frames transmitted/received through the interface 423, a protocol stack 425 for generating header information of the voice frame to be transmitted/received through the interface 423 and the channel element 421, a signaling processor 427 for managing a signaling process for generating header information under the control of the frame controller 431, and a header information storage 429 for storing header information received from the mobile terminals, such as the mobile terminal 400, in association to the mobile terminals. A frame for transmitting header information from the mobile terminal 400 to the Node B 420 is called a "signaling frame". The Node B 420 can use uplink codes in order to identify the header information of the mobile terminals. That is, the Node B 420 detects unique codes for the mobile terminals connected thereto and stores the detected codes. Further, the Node B 420 detects header information received from the mobile terminals and stores the detected header information in association with the unique codes of the mobile terminals that have transmitted the header information. This relation is illustrated in Table 1.

TABLE 1

| # | Mobile Terminal | Header Information |
|---|---|---|
| 1 | code 1[ . . . ] | RTP header [ . . . ] <br> UDP header [ . . . ] <br> IP header [ . . . ] |
| 2 | code 2[ . . . ] | RTP header [ . . . ] <br> UDP header [ . . . ] <br> IP header [ . . . ] |
| . | . | . |
| . | . | . |
| . | . | . |
| n | code n[ . . . ] | RTP header [ . . . ] <br> UDP header [ . . . ] <br> IP header [ . . . ] |

Further, in order to identify header information of UEs (User Equipments, or mobile terminals), the Node B 420 can optionally use UE ID. Such UE ID includes TMSI (Temporary Mobile Subscriber Identity) used to temporarily assign IDs to the UEs, IMEI (International Mobile Equipment Identity) used to identify international subscribers, IMSI (International Mobile Subscriber Identity), PMSI (Packet Mobile Subscriber ID), and CEI (Channel Element Index).

The signaling message transmitted from the mobile terminal 400 to the Node B 420 through the control channel can be an origination message, a structure of which is illustrated in Table 2.

TABLE 2

| Type | Origination Message Code | Extension Length | Version |
|------|--------------------------|------------------|---------|
|      | Source IP Address        |                  |         |
|      | Destination IP Address   |                  |         |

In Table 2, the origination message according to the present invention additionally defines an Extension field for carrying header information on the general origination message. The Extension field, the fields excepting an Origination Message field, is comprised of a Type field indicating one of the RTP, UDP, and IP headers, and a Flag for an additional function. For example, the Flag for an additional function is comprised of a Code field indicating a binding cache time of the Node B, an Extension Length field indicating a length of the added Extension field, a Version field indicating version information (e.g., Version 4 (IPv4) and Version 6 (IPv6)) of the IP in use, a Source IP Address indicating an IP address of a source (or origination) mobile terminal, and a Destination IP Address field indicating an IP address of a destination mobile terminal.

Descriptions of the invention will be made separately for a case where the mobile terminal 400 transmits a voice frame and another case where the Node B 420 transmits a voice frame.

In the former case, upon receipt of a call attempt request from a user, the mobile terminal 400 generates a telephone number or an IP address input by the user and provides the generated telephone number or IP address to a signaling processor 401. The signaling processor 401 receives the telephone number or IP address, and provides the protocol stack 403 with a header generation command based on the received telephone number or IP address. The protocol stack 403 generates RTP header, UDP header, and IP header in response to the header generation command, and provides them to a signaling frame transceiver 411 of a frame handler 407. The frame transceiver 411 provides the generated header information to the physical layer 413. The physical layer 413 carries the header information on the signaling frame, spreads the signaling frame with a user identification code, modulates the spread signaling frame into a radio signal, and transmits the radio signal to the Node B 420 through the second channel Ch2.

After transmission of the signaling frame carrying the header information, the mobile terminal 400 receives user's voice through a speech path formed through call negotiation with the Node B 420. The codec 405 then encodes the received user's voice into voice data and provides the voice data to the voice frame transceiver 409. The voice frame transceiver 409 receives the voice data and provides the received voice data to the physical layer 413 in a voice frame unit. The physical layer 413 modulates the voice frame into a radio signal and transmits the radio signal to the Node B 420 through the first channel Ch1.

The Node B 420 receives the signaling frame transmitted by the mobile terminal 400 from the second channel Ch2 through an antenna ANT. The signaling frame received through the antenna ANT is provided to the channel element 421. The channel element 421 detects a terminal code from the received signaling frame and provides the detected terminal code to the frame controller 431 through the interface 423. Further, the channel element 421 demodulates the signaling frame received in the form of the radio signal, and provides the demodulated signaling frame to the protocol stack 425 through the interface 423. The frame controller 431 receives a unique code for the mobile terminal, output from the channel element 421, and allows the signaling processor 427 to control an operation of processing the signaling frame. The signaling processor 427, under the control of the frame controller 431, detects headers from the received signaling frame and provides the detected headers to the header information storage 429.

After storing the headers from the mobile terminal in the header information storage 429, the frame controller 431 detects a terminal identification code for the voice frame received through the channel element 421, and searches the header information storage 429 for the header information corresponding to the detected code. Upon detecting the header information, the frame controller 431 adds the detected header information to the voice frame and transmits it to the upper core network.

By doing so, it is possible to transmit only the pure voice frame through voice transmission channel, i.e., the first channel CH1, on the radio link between the mobile terminal 400 and the Node B 420.

In the latter case, the Node B 420 receives an IP-based transmission frame from the core network. The received transmission frame is comprised of a voice frame and a header added to the voice frame. The Node B 420 separates the header and the voice frame from the transmission frame received from the core network, and searches the header information storage 429 for a code corresponding to the header information. Upon detecting the corresponding code, the Node B 420 transmits the voice frame corresponding to the detected code through the first channel Ch1 allocated to the mobile terminal 400. Here, it is not necessary to transmit the separated header. However, when it is necessary to indicate source (or caller) information, the Node B 420 can carry the header on the signaling frame and transmits the signaling frame through the second channel Ch2 before transmitting the voice frame during initial destination-call setup. To be specific, upon receiving a transmission frame comprised of the header and the voice frame from the core network, the frame controller 431 of the Node B 420 determines whether the header information for the mobile terminal 400 that has transmitted the transmission frame is stored in the header information storage 429. If the header information for the mobile terminal 400 is stored in the header information storage 429, the frame controller 431 provides the transmission frame to the protocol stack 425 through the interface 423, and controls the signaling processor 427 to separate the header and the frame from the transmission frame through the protocol stack 425. The separated header is used only for identifying the destination terminal, and the voice frame is transmitted to the mobile terminal 400 through the channel element 421 assigned the first channel Ch1.

The mobile terminal 400 receives the voice frame transmitted by the Node B 420 through the physical layer 413 for the first channel Ch1. The received voice frame is converted into voice through the voice frame transceiver 409 and the codec 405.

Figure 5:
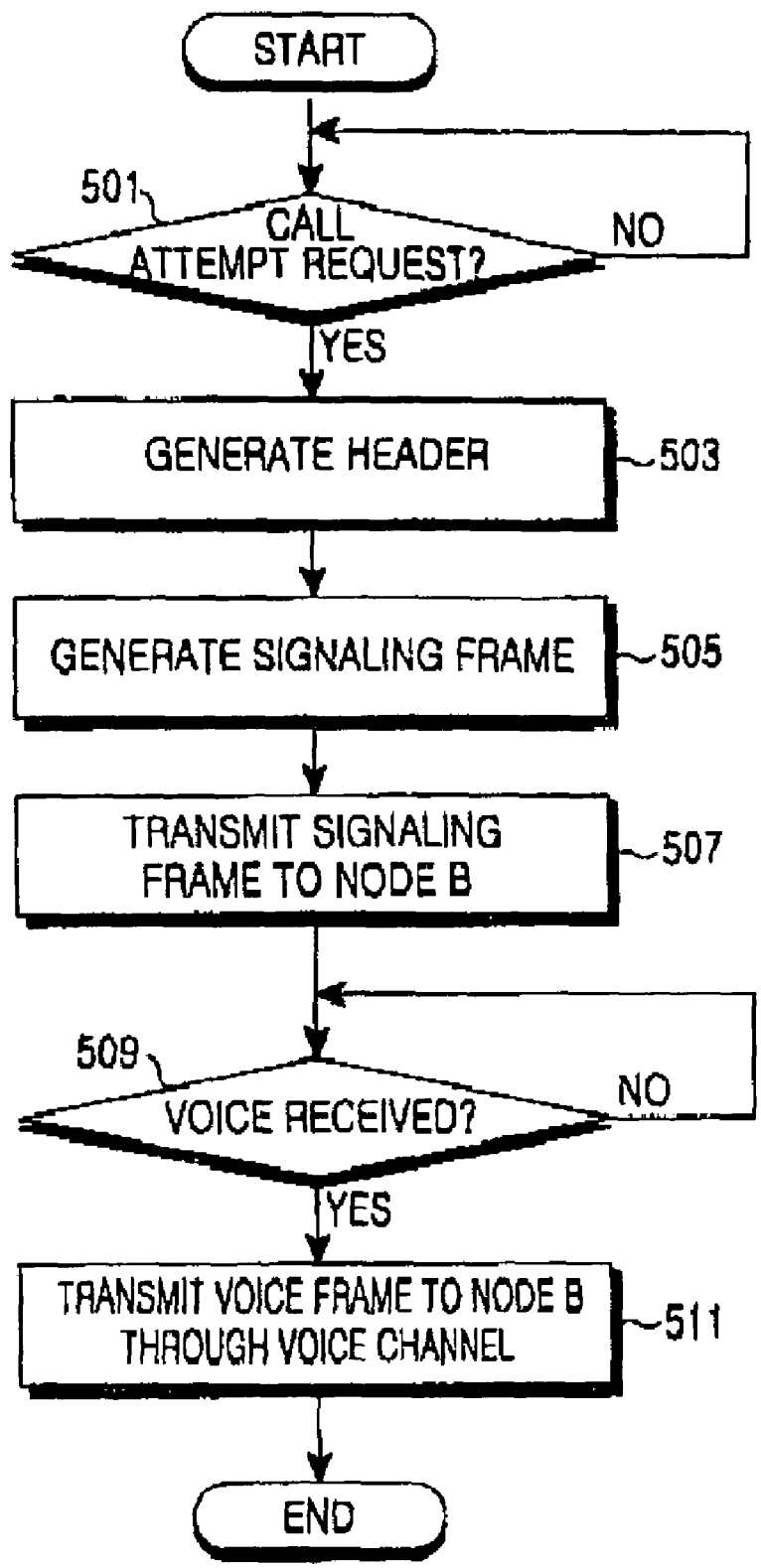
FIG. 5 illustrates a procedure for transmitting a voice frame by a mobile terminal in a mobile communication system supporting an ALL-IP network according to an embodiment of the present invention.

FIG. 5 illustrates a procedure for transmitting a voice frame during call origination by a mobile terminal in a mobile communication system supporting an ALL-IP network according to an embodiment of the present invention. A voice frame transmission method by the mobile terminal will be described in detail with reference to FIG. 5.

Referring to FIG. 5, the mobile terminal 400 determines in step 501 whether a call attempt request is received from the user. Upon receiving a call attempt request from the user, the mobile terminal 400 generates a header in the signaling processor 401 and the protocol stack 403 in response to a telephone number or IP address input by the user, in step 503. After generating the header in step 503, the mobile terminal 400 carries the generated header on the signaling frame in step 505, and then proceeds to step 507 where the signaling frame transceiver 411 spreads the signaling frame with the header using the terminal identification code and transmits the spread signaling frame to the Node B 420 through the second channel Ch2 of the physical layer 413. In step 509, the mobile terminal 400 establishes an existing channel or a separate voice-only channel for exclusively transmitting voice data, and upon receipt of voice from the user, the mobile terminal 400 proceeds to step 511, where the codec 405 of the mobile terminal 400 converts the received voice into voice data and transmits the converted voice data to the voice frame transceiver 409, and the voice frame transceiver 409 constructs a voice frame with a specific length using the received voice data. The voice frame is provided to the physical layer 413, where it is spread with the terminal identification code, and then transmitted to the Node B through the existing channel or the first channel Ch1, the separate voice-only channel. However, if no voice is received, the mobile terminal 400 returns to step 503 and repeatedly performs the process of step 503 and it succeeding steps at stated periods.

Figure 6:
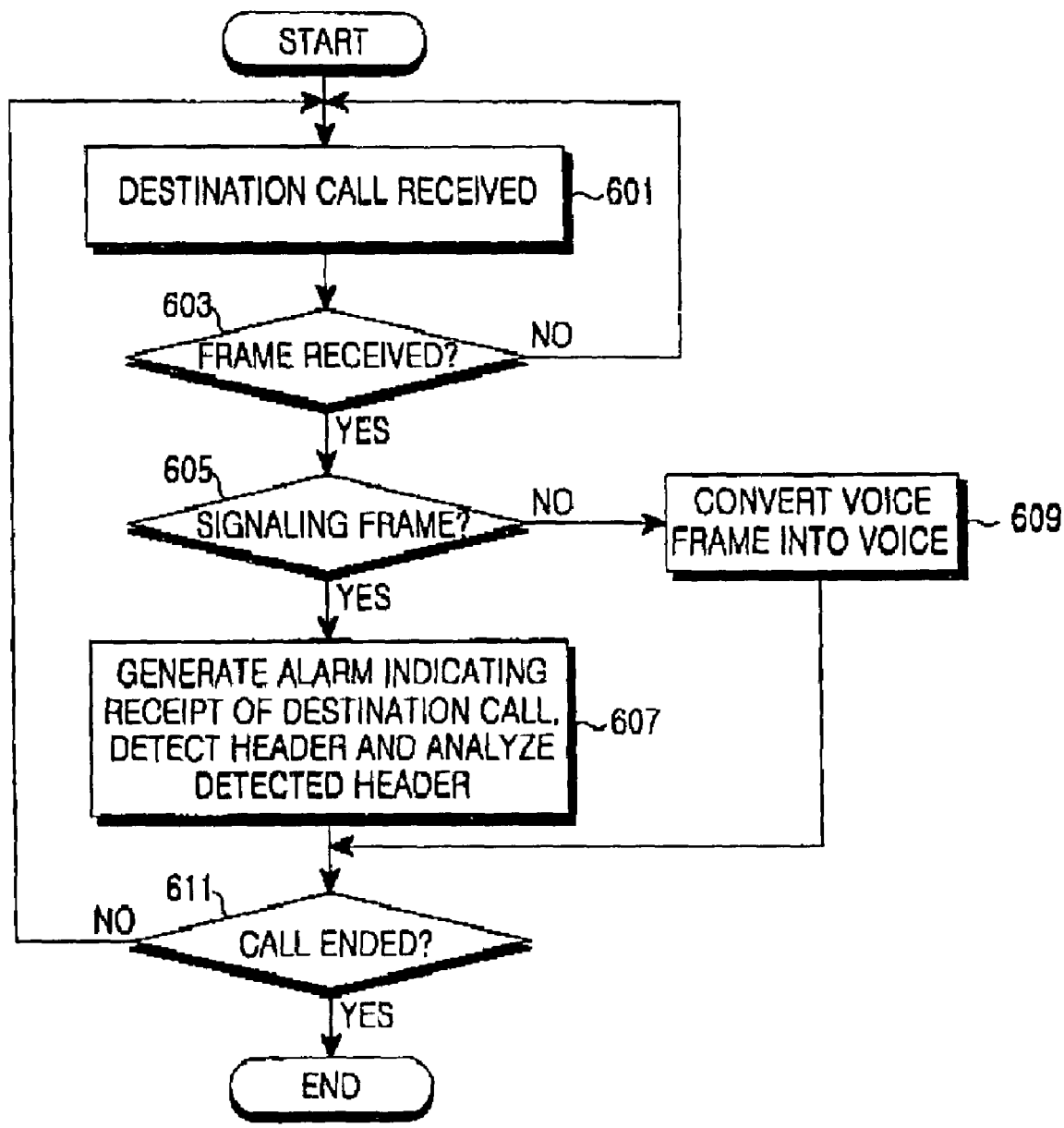
FIG. 6 illustrates a procedure for receiving a voice frame by a mobile terminal in a mobile communication system supporting an ALL-IP network according to an embodiment of the present invention.

FIG. 6 illustrates a procedure for receiving a voice frame by a mobile terminal in a mobile communication system supporting an ALL-IP network according to an embodiment of the present invention. A voice frame reception method by the mobile terminal will be described in detail with reference to FIG. 6.

Referring to FIG. 6, the mobile terminal 400 periodically checks in step 601 whether a destination (or incoming) call is received. Upon receiving a destination call, the mobile terminal 400 determines in step 603 whether a frame is received. Upon receiving a frame, the mobile terminal 400 determines in step 605 whether the received frame is a signaling frame or a voice frame. If the received frame is a voice frame, the mobile terminal 400 proceeds to step 609. Otherwise, if the received frame is a signaling frame, the mobile terminal 400 proceeds to step 607. Here, the signaling frame is a general signaling frame, and when it is necessary to receive the originator's information (or caller information), the mobile terminal 400 may receive the signaling information according to the present invention. In step 609, the mobile terminal 400 demodulates the voice frame into voice. In step 607, the mobile terminal 400 generates an alarm indicating reception of the destination call based on the signaling frame, and when the signaling frame is identical to the signaling frame according to the present invention, the mobile terminal 400 detects a header from the signaling frame, analyzes the detected header and then outputs the analyzed header information. The analyzed header information is displayed on a display device of the mobile terminal 400 to inform the user of the caller information. After steps 607 and 609, the mobile terminal 400 determines in step 611 whether the call is ended. If the call is not ended, the mobile terminal 400 returns to step 603.

Figure 7:
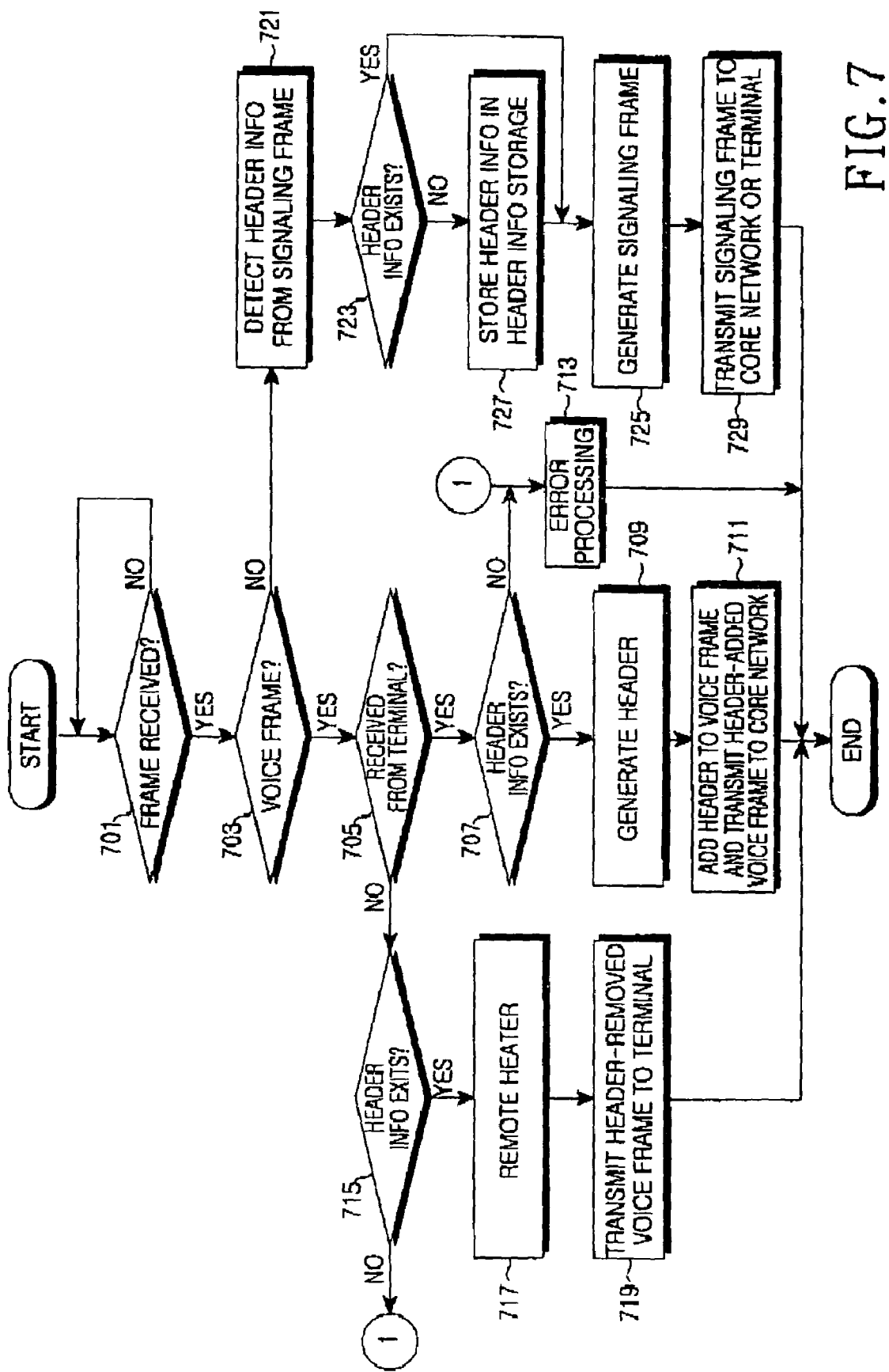
FIG. 7 illustrates a procedure for processing a voice frame by a Node B in a mobile communication system supporting an ALL-IP network according to an embodiment of the present invention.

FIG. 7 illustrates a procedure for processing a voice frame by a Node B in a mobile communication system supporting an ALL-IP network according to an embodiment of the present invention. A voice frame processing method by the Node B will be described in detail with reference to FIG. 7.

Referring to FIG. 7, the Node B 420 determines in step 701 whether a frame is received from the mobile terminal 400 through the channel element 421. Upon receiving a frame through the channel element 421, the Node B 420 determines in step 703 whether the received frame is a voice frame or a signaling frame. If the received frame is a signaling frame, the Node B 420 proceeds to step 721 where it detects header information included in the signaling frame. Thereafter, the Node B 420 determines in step 723 whether the header information storage 429 has the same code as a code for identifying the mobile terminal 400 that has transmitted the header information. If there exists the same header information for the mobile terminal, the Node B 420 proceeds to step 725. Otherwise, if the header information does not exist in a table of the header information storage 429, the Node B proceeds to step 727 where it stores the detected header information in the header information storage 429 along with the unique code for the mobile terminal. However, when the header information for the mobile terminal exists in the table, it is not necessary to store the detected header information, so the Node B 420 performs the signaling process in step 725. That is, the Node B 420 carries the header information for the mobile terminal, stored in the header information storage 429, on the signaling frame, and then transmits the signaling frame to the core network in step 729.

The description of the invention has been made for the case where the signaling message is received from the mobile terminal 400. However, when it is intended to originate a call to a specific mobile terminal, the Node B 420 receives a signaling message from the core network and transmits the received signaling message to the specific mobile terminal. This operation is performed in the known method, so a detailed description thereof will not be provided for simplicity. However, as to a mobile terminal requiring the caller information, the Node B 420 may transmit a signaling message according to the present invention, i.e., a signaling frame with the header information to the mobile terminal.

If it is determined in step 703 that the received frame is a voice frame, the Node B 420 determines in step 705 whether the voice frame is received form the mobile terminal 400 or the core network. As a result of the determination, if the voice frame is received from the mobile terminal 400, the Node B 420 proceeds to step 707, and if the voice frame is received from the core network, the Node B 420 proceeds to step 715. In step 707, the Node B 420 searches the table of the header information storage 423 to determine whether header information for the mobile terminal 400 exists. If the header information does not exist in the header information storage 429, the Node B 420 performs an error process in step 713. Otherwise, if the header information exists in the header information storage 429, the Node B 420 proceeds to step 709 where it generates a header based on the stored header information, and performs RTP, UDP and IP protocol operations. Thereafter, in step 711, the Node B adds the headers to the voice frame, and then transmits the header-added voice frame to the core network.

However, if it is determined in step 705 that the voice frame is received from the core network, the Node B 420 determines in step 715 whether the header information for the mobile terminal that will receive the voice frame exists in the table of the header information storage 429. If the header information for the mobile terminal does not exist in the header information storage 429, the Node B 420 proceeds to step 713 where it performs the error process. Otherwise, if there exists the header information, the Node B 420 proceeds to step 717 where it performs a protocol operation and removes the header from the transmission frame comprised of the headers and the voice frame. Thereafter, in step 719, the Node B 420 transmits the header-removed voice frame to the mobile terminal 400 through the first channel Ch1. Although the present invention has been applied to the voice frame, it can also be applied to the data frame.

The apparatus and method according to the present invention can prevent excessive addition of headers to voice/data traffic, occurring in a radio region between the mobile terminal and the Node B in a mobile communication system supporting an ALL-IP network. In addition, the apparatus and method can effectively use the same radio band in various radio networks as well as the 3$^{rd}$ generation mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmission apparatus for transmitting a signaling frame and a voice frame to a reception apparatus in a CDMA (Code Division Multiple Access) mobile communication system having an ALL-IP (Internet Protocol) network, comprising:
   a signaling frame transmitter for transmitting header information, needed to transmit a voice frame to a destination, to the reception apparatus through a signaling frame during a call setup at a call attempt request of a user over a first channel; and
   a voice frame transmitter for constructing the voice frame using header information identification and voice data to be transmitted, upon completion of the call setup, and transmitting the constructed voice frame to the reception apparatus over a second channel different from the first channel,
   wherein the header identification information is a code used for the voice frame transmitted through the second channel.

2. The transmission apparatus of claim 1, wherein the signaling frame transmitter comprises:
   a signaling processor for outputting a header generating command during the call setup;
   a protocol stack for generating header information corresponding to a destination ID (Identifier) input by the user in response to the header generation command; and
   a transmitter for transmitting the header information to the reception apparatus through the signaling frame.

3. The transmission apparatus of claim 2, wherein the destination ID includes at least one of a telephone number and an IP address.

4. The transmission apparatus of claim 3, wherein the header information includes at least one of RTP (Real Time Protocol) header information, UDP (User Datagram Protocol) header information, and IP header information.

5. The transmission apparatus of claim 1, wherein the voice frame transmitter comprises:
   a codec for converting voice signals to be transmitted into voice data, after completion of the call setup; and
   a transmitter for constructing the voice frame using header identification information and the voice data, and transmitting the constructed voice frame to the reception apparatus.

6. A method for transmitting a signaling frame and a voice frame to a reception apparatus in a CDMA (Code Division Multiple Access) mobile communication system having an ALL-IP network, comprising the steps of:
   transmitting header information, needed to transmit a voice frame to a destination, to the reception apparatus through a signaling frame during a call setup at a call attempt request of a user over a first channel; and
   upon completion of the call setup, transmitting the voice frame constructed by a header identification information and a voice data to the reception apparatus over a second channel different from the first channel,
   wherein the header identification information is a code used for the voice frame transmitted through the second channel.

7. The method of claim 6, wherein the signaling frame transmission step comprises the steps of:
   outputting a header generating command during the call setup;
   generating header information corresponding to a destination ID (Identifier) input by the user in response to the header generation command; and
   transmitting the header information to the reception apparatus through the signaling frame.

8. The method of claim 7, wherein the destination ID includes at least one of a telephone number and an IP address.

9. The method of claim 8, wherein the header information includes at least one of RTP (Real Time Protocol) header information, UDP (User Datagram Protocol) header information, and IP header information.

10. The method of claim 6, wherein the voice frame transmitting step comprises the steps of:
    converting voice signals to be transmitted into voice data, after completion of the call setup;
    constructing the voice frame using header identification information and the voice data; and
    transmitting the constructed voice frame to the reception apparatus.

11. A method for receiving a signaling frame and a voice frame from at least one transmission apparatus through a first channel and a second channel in a CDMA (Code Division Multiple Access) mobile communication system having an ALL-IP network, the second channel being different from the first channel, comprising the steps of:
    upon receipt of a call setup request, acquiring header information, needed to transmit a voice frame to a destination, from a signaling frame received through the first channel, and storing the acquired header information in association with a code used for the transmission apparatus;
    after completion of the call setup, extracting a code used for the voice frame received through the second channel, and detecting header information corresponding to the extracted code from the header information stored in association with the code; and
    adding the detected header information to the voice frame, and transmitting the header-added voice frame to the destination.

12. The method of claim 11, wherein the header information includes at least one of RTP (Real Time Protocol) header information, UDP (User Datagram Protocol) header information, and IP header information.

13. The method of claim 11, further comprising the step of deleting header information stored in association with a code for a release-requested call, upon receipt of a request for releasing the call.

14. An apparatus for receiving a signaling frame and a voice frame from at least one transmission apparatus through a first channel and a second channel in a CDMA (Code Division Multiple Access) mobile communication system having an ALL-IP network, the second channel being different from the first channel, comprising:
- a protocol stack for, upon receipt of a call setup request, acquiring header information, needed to transmit a voice frame to a destination, from a signaling frame received through the first channel;
- a header information storage for storing the acquired header information in association with a code used for the transmission apparatus; and
- a frame controller for, after completion of the call setup, detecting header information corresponding to a code used for the voice frame received through the second channel, adding the detected header information to the voice frame, and transmitting the header-added voice frame to the destination.

15. The apparatus of claim 14, wherein the header information includes at least one of RTP (Real Time Protocol) header information, UIDP (User Datagram Protocol) header information, and IP header information.

16. The apparatus of claim 14, wherein the frame controller deletes header information stored in the header information storage in association with a code for a release-requested call, upon receipt of a request for releasing the call.

17. A method for transmitting a frame in a CDMA (Code Division Multiple Access) mobile communication system having an ALL-IP network, comprising the steps of:
- transmitting, by a mobile terminal, header information needed to transmit a voice frame to a destination through a signaling frame during a call setup at a call attempt request of a user over a first channel;
- constructing, by a mobile terminal, the voice frame using header identification information and voice data to be transmitted, upon completion of the call setup;
- transmitting, by the mobile terminal, the constructed voice frame over a second channel different from the first channel;
- acquiring, by a Node B, header information, needed to transmit the voice frame to a destination, from the signaling frame received through the first channel;
- storing, by the Node B, acquired header information corresponding to the header identification information;
- upon receipt of the voice frame, acquiring, by a Node B, header identification information from the voice frame received through the second channel;
- adding, by a Node B, the header information stored corresponding to the header identification information to the voice frame; and
- transmitting, by a Node B, the header-added voice frame to a core network,
- wherein the header identification information is a code used for the voice frame transmitted through the second channel.

18. The method of claim 17, wherein the header information includes at least one of RTP (Real Time Protocol) header information, UDP (User Datagram Protocol) header information, and IP header information.

19. The method of claim 17, further comprising the step of deleting header information stored in association with a code for a release-requested call, upon receipt of a request for releasing the call.

20. An apparatus for transmitting a frame in a CDMA (Code Division Multiple Access) mobile communication system having an ALL-IP network, comprising:
- a mobile terminal for transmitting header information needed to transmit a voice frame to a destination through a signaling frame during a call setup at a call attempt request of a user over a first channel, constructing the voice frame using header identification information and voice data to be transmitted, upon completion of the call setup, and transmitting the constructed voice frame over a second channel different from the first channel; and
- a Node B for acquiring header information from the signaling frame received through the first channel, storing acquired header information corresponding to the header identification information, upon receipt of the voice frame, acquiring header identification information from the voice frame received through the second channel, and adding the header information stored corresponding to the header identification information to the voice frame and transmitting the header-added voice frame to a core network,
- wherein the header identification information is a code used for the voice frame transmitted through the second channel.

21. The apparatus of claim 20, wherein the header information includes at least one of RTP (Real Time Protocol) header information, UDP (User Datagram Protocol) header information, and IP header information.

22. The apparatus of claim 20, wherein the Node B deletes header information stored in association with a code for a release-requested call, upon receipt of a request for releasing the call.

23. A method for transmitting a transmission frame, received from a core network, from a Node B to a mobile terminal in a CDMA (Code Division Multiple Access) mobile communication system having an ALL-IP network and transmitting a signaling frame and a voice frame to the mobile terminal through a first channel and a second channel, the second channel being different from the first channel, comprising the steps of:
- determining a type of a transmission frame received from the core network;
- if the transmission frame is a signaling frame, transmitting the transmission frame with header information to the mobile terminal through the first channel; and
- if the transmission frame is a voice frame, removing header information from the transmission frame and transmitting the header-removed transmission frame to the mobile terminal through the second channel.

24. The method of claim 23, wherein the header information includes at least one of RTP (Real Time Protocol) header information, UDP (User Datagram Protocol) header information, and IP header information.

25. An apparatus for transmitting a transmission frame, received from a core network, from a Node B to a mobile terminal in a CDMA (Code Division Multiple Access) mobile communication system having an ALL-IP network and transmitting a signaling frame and a voice frame to the mobile terminal through a first channel and a second channel, the second channel being different from the first channel, comprising:
- a header information storage for storing header information in association with a code for identifying the mobile terminal;
- a protocol stack for separating header information from a transmission frame received from the core network; and
- a frame controller for transmitting the transmission frame with header information to the mobile terminal through the first channel if the transmission frame is a signaling frame; and removing header information from the transmission frame, and transmitting the header-removed transmission frame to the mobile terminal through the second channel, if the transmission frame is a voice frame.

26. The apparatus of claim 25, wherein the header information includes at least one of RTP (Real Time Protocol) header information, UDP (User Datagram Protocol) header information, and LP header information.

27. A transmission apparatus in an IP-based mobile communication system in which a mobile terminal transmits a signaling frame over a first channel and a packet data frame over a second channel different from the first channel, comprising:
   a header information storage for, upon receipt of a call setup request. generating a table in which header information detected from the signaling frame is mapped to a unique code of the mobile terminal, and storing the table therein; and
   a transmission frame generator for, after completion of the call setup, receiving a packet data frame transmitted by the mobile terminal, adding to the packet data frame a header corresponding to the mobile terminal, the header read from the header information storage, and transmitting the header-added packet data frame to a core network.

28. A data processing method for a Node B in an IP-based mobile communication system in which a mobile terminal transmits a signaling frame over a first channel and a packet data frame over a second channel different from the first channel, comprising the steps of:
   upon receipt of a call setup request, detecting a header from the signaling frame received from the mobile terminal, generating a table including header information for the mobile terminal, and storing the table in a header information storage; and
   after completion of the call setup, receiving a packet data frame transmitted by the mobile terminal, adding to the packet data frame a header corresponding to the mobile terminal, the header read from the header information storage, and transmitting the header-added packet data frame to a core network.

* * * * *